United States Patent [19]
Huang et al.

[11] Patent Number: 5,992,492
[45] Date of Patent: Nov. 30, 1999

[54] HORIZONTAL TYPE THERMO-SHRINKING FILM LABELING MACHINE

[76] Inventors: Fu-Chuan Huang, No. 111-11, Chung Chuang Tsun, Shui Shang Hsiang, Chia I Hsien; Chien-Tsai Huang, No. 146, Sec. 1, Chung Shan E. Rd.; Chin-Tsai Wu, 2 Fl., No.4, Lane 90, Chang Chiang Rd., both of Chung Li City, Tao Yuan Hsien, all of Taiwan

[21] Appl. No.: 09/093,862

[22] Filed: Jun. 9, 1998

[51] Int. Cl.⁶ ..................................................... B32B 31/00
[52] U.S. Cl. ........................... 156/494; 156/86; 156/499; 156/521; 156/567
[58] Field of Search ................................. 156/84, 85, 86, 156/494, 499, 510, 516, 517, 521, 556, 566, 567, 569

[56] References Cited

U.S. PATENT DOCUMENTS

| | | | |
|---|---|---|---|
| 4,806,187 | 2/1989 | Fujisawa | 156/86 |
| 5,108,537 | 4/1992 | Garnes et al. | 156/447 |
| 5,398,395 | 3/1995 | Woolls | 29/417 |
| 5,403,416 | 4/1995 | Bright et al. | 156/86 |
| 5,417,794 | 5/1995 | Menayan | 156/362 |
| 5,843,362 | 12/1998 | Yoshii et al. | 264/342 R |

*Primary Examiner*—James Sells
*Attorney, Agent, or Firm*—Varndell & Varndell, PLLC

[57] ABSTRACT

A horizontal type thermo-shrinking film labeling machine includes a tubular thermo-shrinking film dispensing wheel controlled to let off a thermo-shrinking film, a film delivery uni controlled to deliver the thermo-shrinking film forwards, a central guide shaft which guides the thermo-shrinking film in an opened status, a cutter unit controlled to cut the thermo-shrinking film being delivered from the central guide shaft, a packing wheel rotated to pick up the cut pieces of the thermo-shrinking film, permitting the cut pieces of the thermo-shrinking film to be sleeved onto products carried thereon individually, a feed unit controlled to feed products to respective receiving troughs on the packing wheel, a conveyer controlled to carry thermo-shrinking film packed products to a heating unit for heating, enabling each cut piece of the thermo-shrinking film to shrink and to be firmly secured to the periphery of the corresponding piece of product.

4 Claims, 21 Drawing Sheets

5,992,492

HORIZONTAL TYPE THERMO-SHRINKING FILM LABELING MACHINE

BACKGROUND OF THE INVENTION

The present invention relates to a labeling machine for putting a label of thermo-shrinking film on a product, and more particularly to a horizontal type labeling machine which is suitable for putting a label of thermo-shrinking film to any of a variety of products.

FIG. 1 shows a conventional thermo-shrinking film labeling machine. This labeling machine 1 is a vertical type, comprised of a machine base 10, a thermo-shrinking film dispensing wheel 12 mounted on the machine base 10 at one side, a conveyer 13 mounted on the machine base 10 below the thermo-shrinking film dispensing wheel 12, a heating unit 14 mounted on the machine base 1 over the conveyer 13, a cutter unit (not shown) mounted within a box on the machine base 10 above the conveyer 13 between the thermo-shrinking film dispensing wheel 12 and the heating unit 14. When in use, a tubular thermo-shrinking film 15 is wound round the thermo-shrinking film dispensing wheel 12, permitting the lead end of the tubular thermo-shrinking film 15 to be moved over guide rods 100 on the machine base 10 and inserted into the box in which the cutter unit is mounted. When in use, the tubular thermo-shrinking film 15 is cut at a predetermined frequency, enabling each cut piece of tubular thermo-shrinking film to fall to a corresponding bottle 16 carried on the conveyer 13. When a bottle 16 is carried by the conveyer 13 through the heating unit 14, the respective cut piece of tubular thermo-shrinking film is heated to shrink, and to become firmly secured to the periphery of the bottle 16. This vertical type thermo-shrinking film labeling machine is suitable for labeling products that can be carried on the conveyer 13 in vertical. For labeling products that cannot be stably carried on the conveyer 13, much labor is needed to manually put individual pieces of tubular thermo-shrinking film on the products to be labeled, so that individual pieces of thermo-shrinking film can be further heated with the products.

SUMMARY OF THE INVENTION

The present invention has been accomplished to provide a horizontal type thermo-shrinking film labeling machine which is practical for putting a label of thermo-shrinking film on any of a variety of products. A horizontal type thermo-shrinking film labeling machine according to the present invention comprises a tubular thermo-shrinking film dispensing wheel controlled to let off a thermo-shrinking film, a film delivery unit controlled to deliver the thermo-shrinking film forwards, a central guide shaft which guides the thermo-shrinking film in an opened status, a cutter unit controlled to cut the thermo-shrinking film being delivered from the central guide shaft, a packing wheel rotated to pick up the cut pieces of the thermo-shrinking film, permitting the cut pieces of the thermo-shrinking film to be sleeved onto products carried thereon individually, a feed unit controlled to feed products to respective receiving troughs on the packing wheel, a conveyer controlled to carry thermo-shrinking film packed products to a heating unit for heating, enabling each cut piece of the thermo-shrinking film to shrink and to be firmly secured to the periphery of the corresponding piece of product.

DETAILED DESCRIPTION OF THE PREFERRED EMBODIMENT

Figure 1:
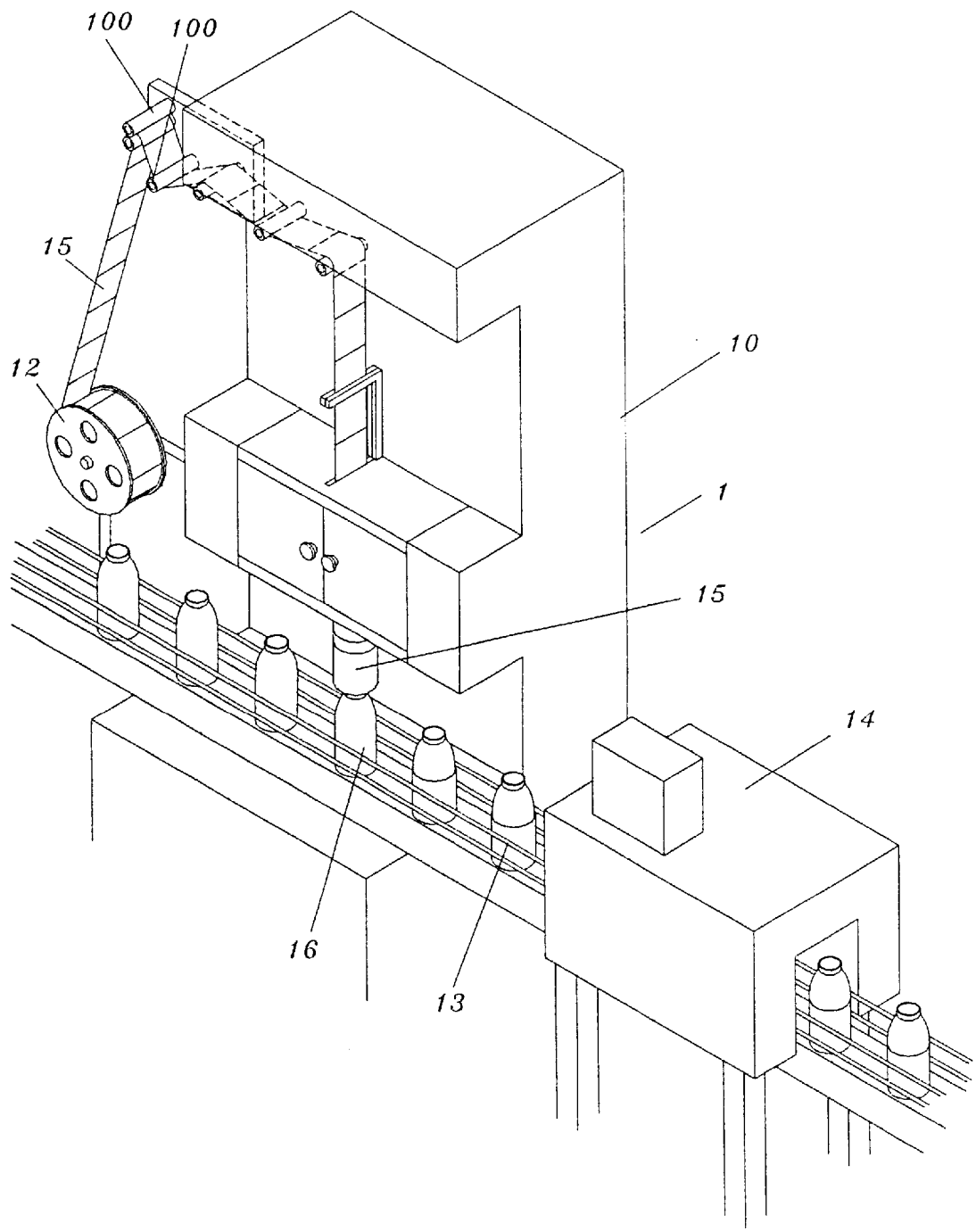
FIG. 1 is a perspective view of a vertical type thermo-shrinking film labeling machine according to the prior art.
Figure 2:
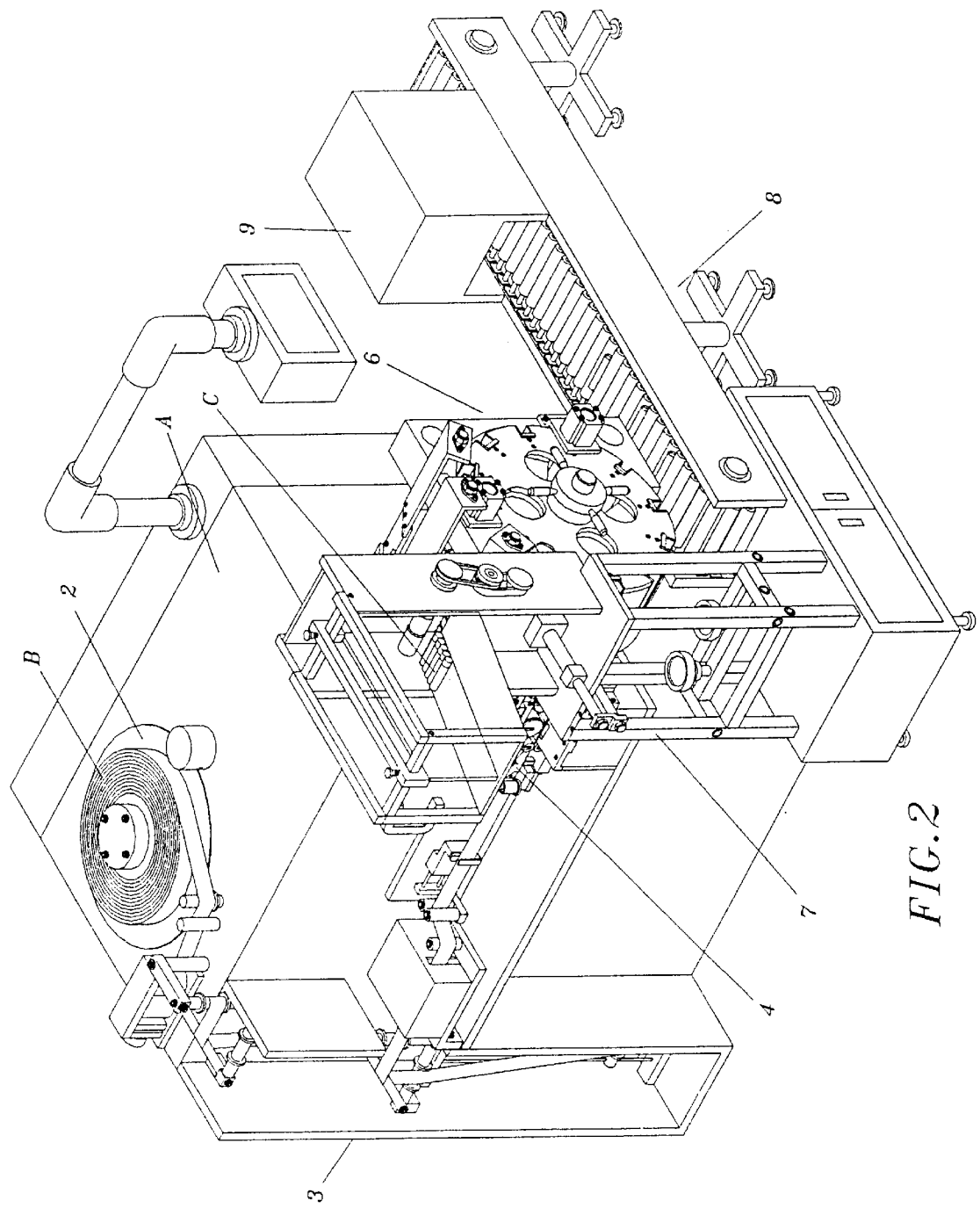
FIG. 2 is an elevational view of a horizontal type thermo-shrinking film labeling machine according to the present invention.
Figure 3:
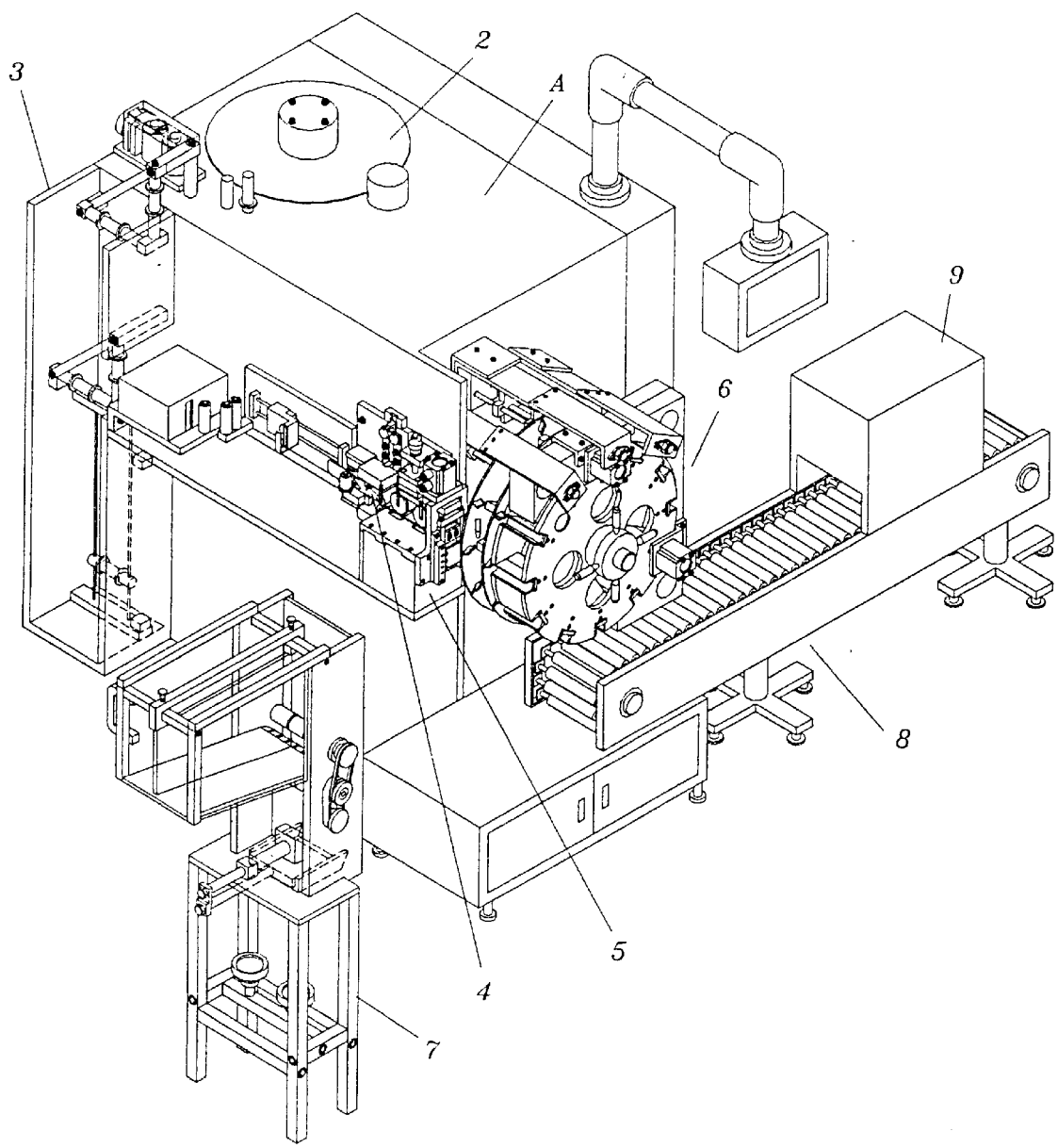
FIG. 3 is a perspective view of a part of the horizontal type thermo-shrinking film labeling machine shown in FIG. 2.

Referring to FIGS. 2 and 3, a horizontal type thermo-shrinking film labeling machine in accordance with the present invention is generally comprised of a tubular thermo-shrinking film dispensing wheel 2, a film delivery unit 3, a central guide shaft 4, a cutter unit 5, a packing wheel 6, a feed unit 7, a conveyer 8, and a heating unit 9.

Figure 4:
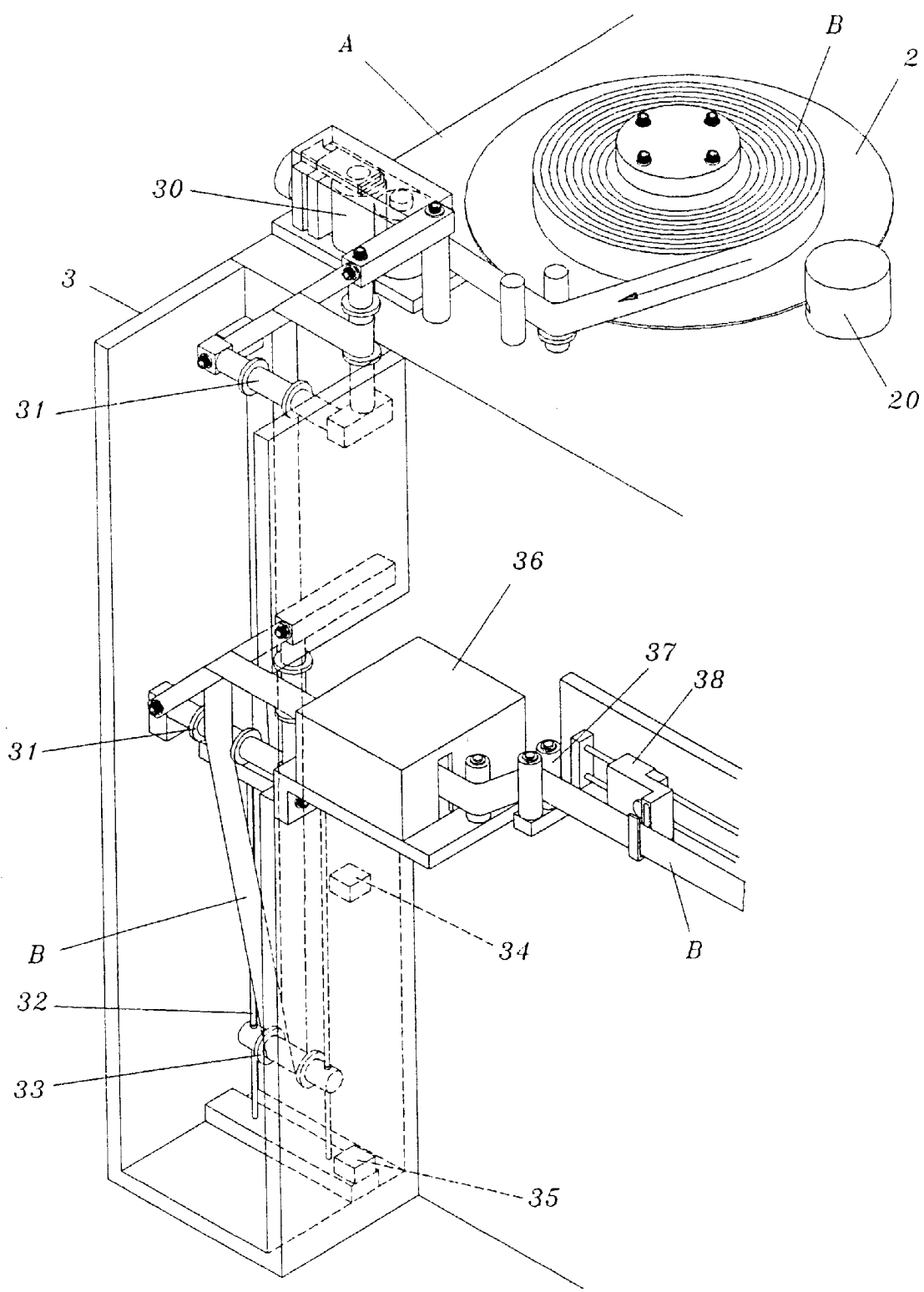
FIG. 4 is a perspective view in an enlarged view of a part of the present invention, showing the arrangement of the film delivery unit.

Referring to FIG. 4, the tubular thermo-shrinking film dispensing wheel 2 is mounted on the frame A of the machine at the top, and rotated to dispense a tubular thermo-shrinking film B loaded thereon. A brake means 20 is provided at one side of the tubular thermo-shrinking film dispensing wheel 2, and controlled to stop the tubular thermo-shrinking film dispensing wheel 2 from rotating.

Referring to FIG. 4, the film delivery unit 3 is mounted on the frame A of the machine at one side adjacent to the tubular thermo-shrinking film dispensing wheel 2, comprising a plurality of film-transfer rollers 30, a plurality of guide rollers 31, two vertical guide rails 32 arranged in parallel, a movable roller 33 moved along the vertical guide rails 32, a first micro-switch 34 and a second micro-switch 35 respectively disposed near top and bottom ends of the guide rails 32, a stamp 36 controlled to stamp for example manufacturing date or expiring date on the tubular thermo-shrinking film B passing through, fixed guide rollers 37 for guiding the tubular thermo-shrinking film B out of the stamp 36, and a movable stretcher 38 movably mounted on the frame A at one side for stretching the tubular thermo-shrinking film B and guiding it to the central guide shaft 4.

Figure 5:
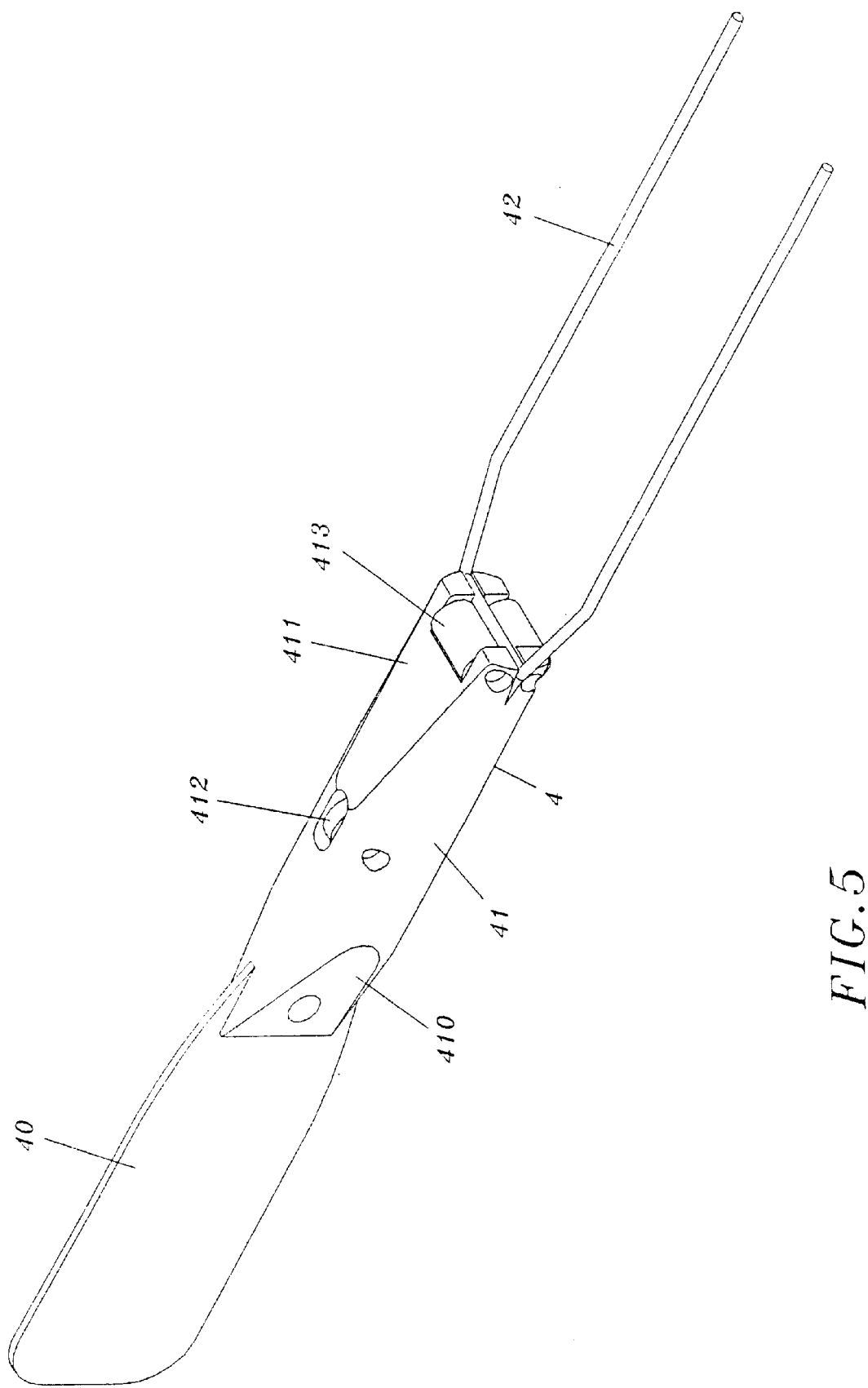
FIG. 5 is a perspective view in an enlarged scale of the central guide shaft according to the present invention.
Figure 6:
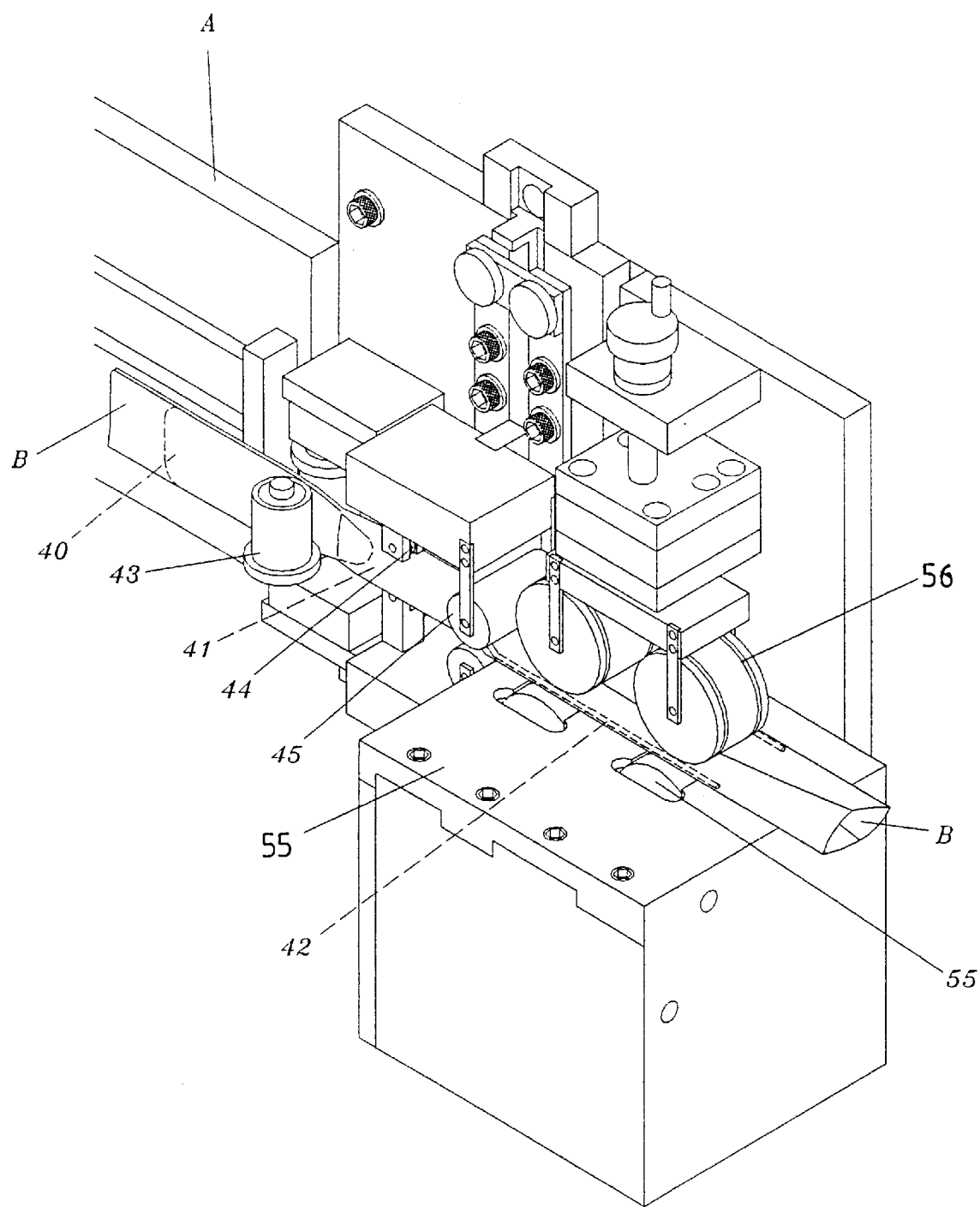
FIG. 6 is a perspective view in an enlarged scale of a part of the present invention, showing the position of the central guide shaft relative to the cutter unit.

Referring to FIGS. 5 and 6 and FIG. 2 again, the central guide shaft 4 is mounted on the frame A between the film delivery unit 3 and the cutter unit 5. The central guide shaft 4 comprises a cylindrical shaft body 41, a flat front board 40 extended from one end namely the front end of the shaft body 41, and two parallel rods 42 extended from an opposite end namely the rear end of the shaft body 41. The flat front board 40 has a rear end connected between beveled left and right edges 410 at the front end of the shaft body 41. The parallel rods 42 each have a front end respectively connected between beveled top and bottom edges 411 at the rear end of the shaft body 41. The shaft body 41 has rollers 412;413 mounted thereon on the middle as well as its rear end. Film-transfer rollers 43;44;45 are respectively mounted on the frame A of the machine, and disposed at left and right sides of the flat board 40 and top and bottom sides of the shaft body 41 and the rods 42.

Referring to Figures from 7 to 9, the cutter unit 5 is mounted on the frame A of the machine adjacent to the central guide shaft 4, comprising a base 55, a vertical cutter holder 50, an upper cutter blade 51 and a lower cutter blade 52 respectively mounted on the cutter holder 50 at different elevations, an air cylinder 53 driven to reciprocate the upper cutter blade 51, a material guide plate 54 connected to the vertical cutter holder 50 at one side and supported on the base 55, and pairs of film-transfer rollers 56 revolvably mounted on the base 55 for delivering the tubular thermo-shrinking film B to the material guide plate 54.

Figure 8:
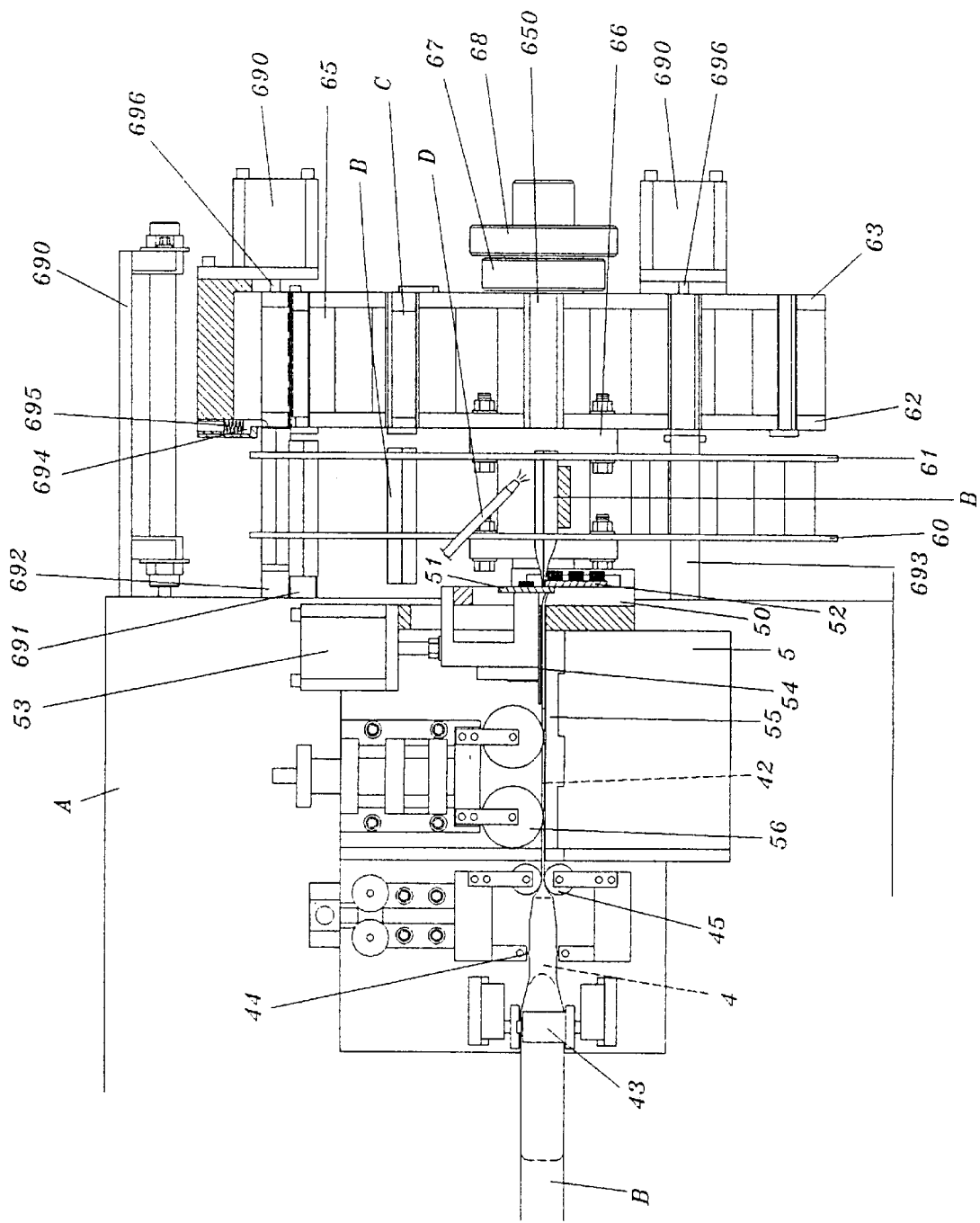
FIG. 8 is a partial view of the present invention showing the arrangement of the central guide shaft, the cutter unit, and the packing wheel.
Figure 9:
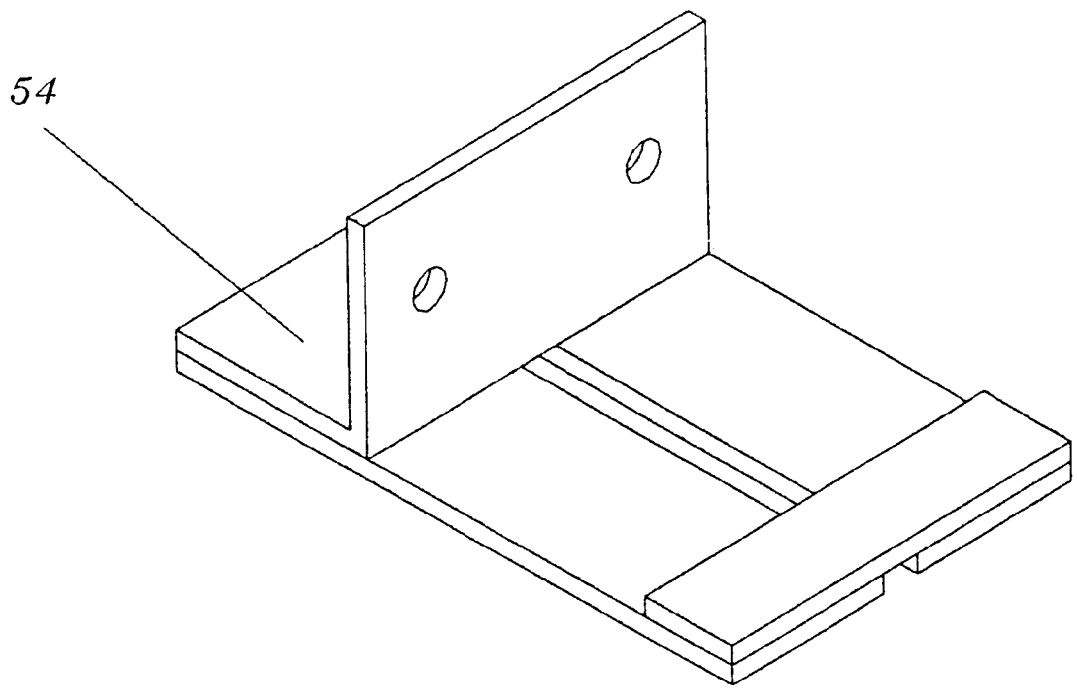
FIG. 9 is a perspective view in an enlarged scale of the material guide plate according to the present invention.
Figure 10:
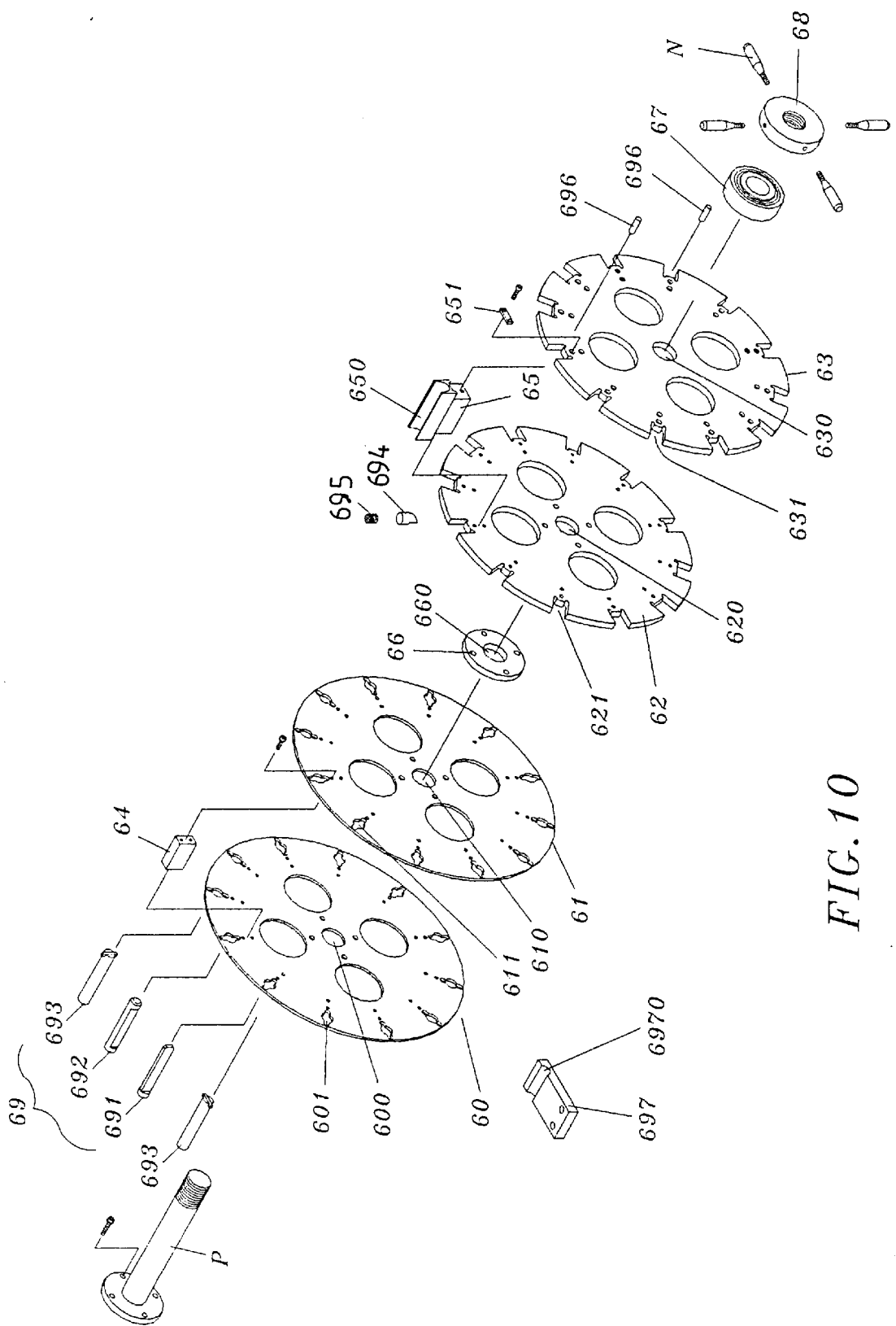
FIG. 10 is an exploded view of the packing wheel according to the present invention.
Figure 11:
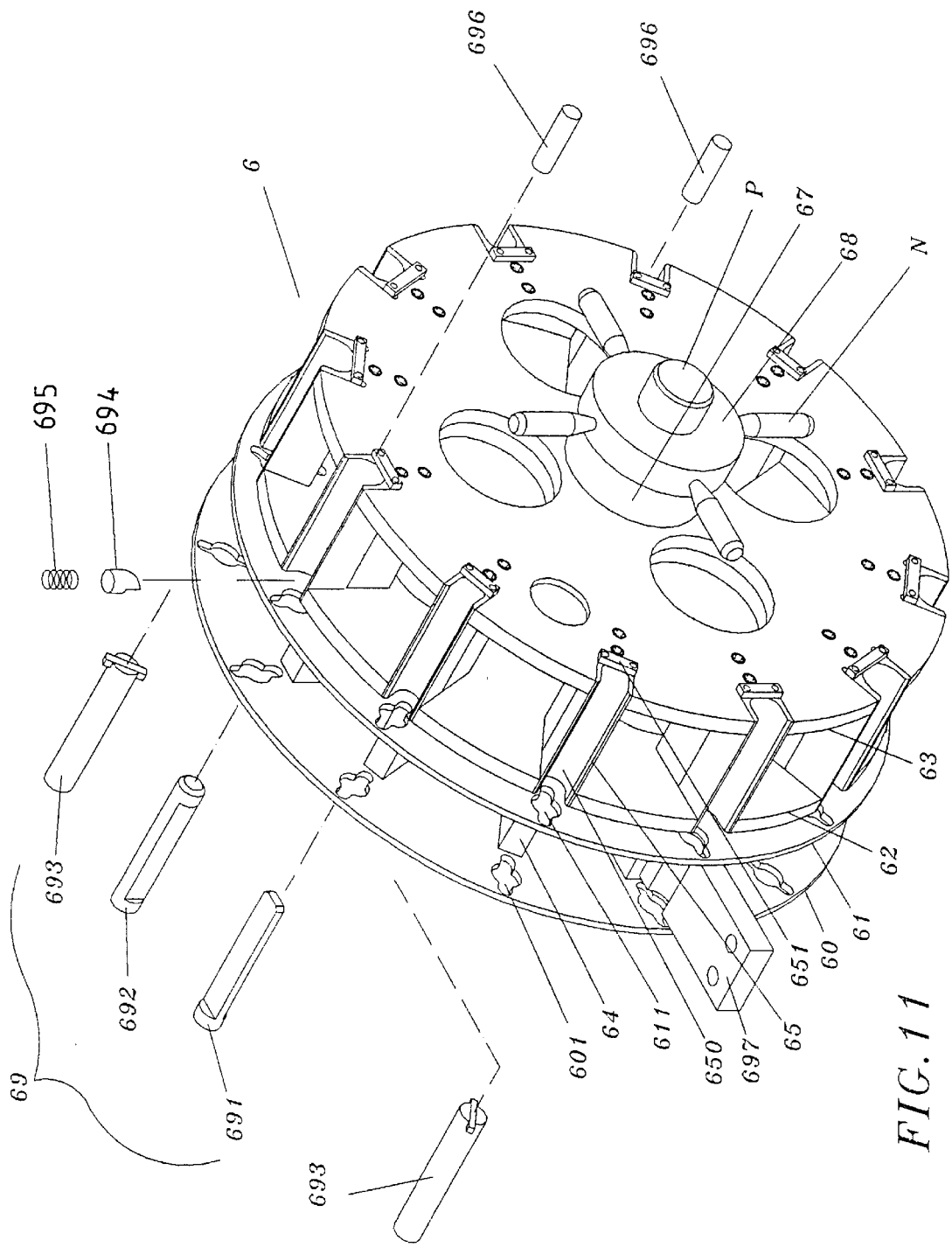
FIG. 11 is a perspective assembly view in an enlarged scale of FIG. 10.
Figure 12:
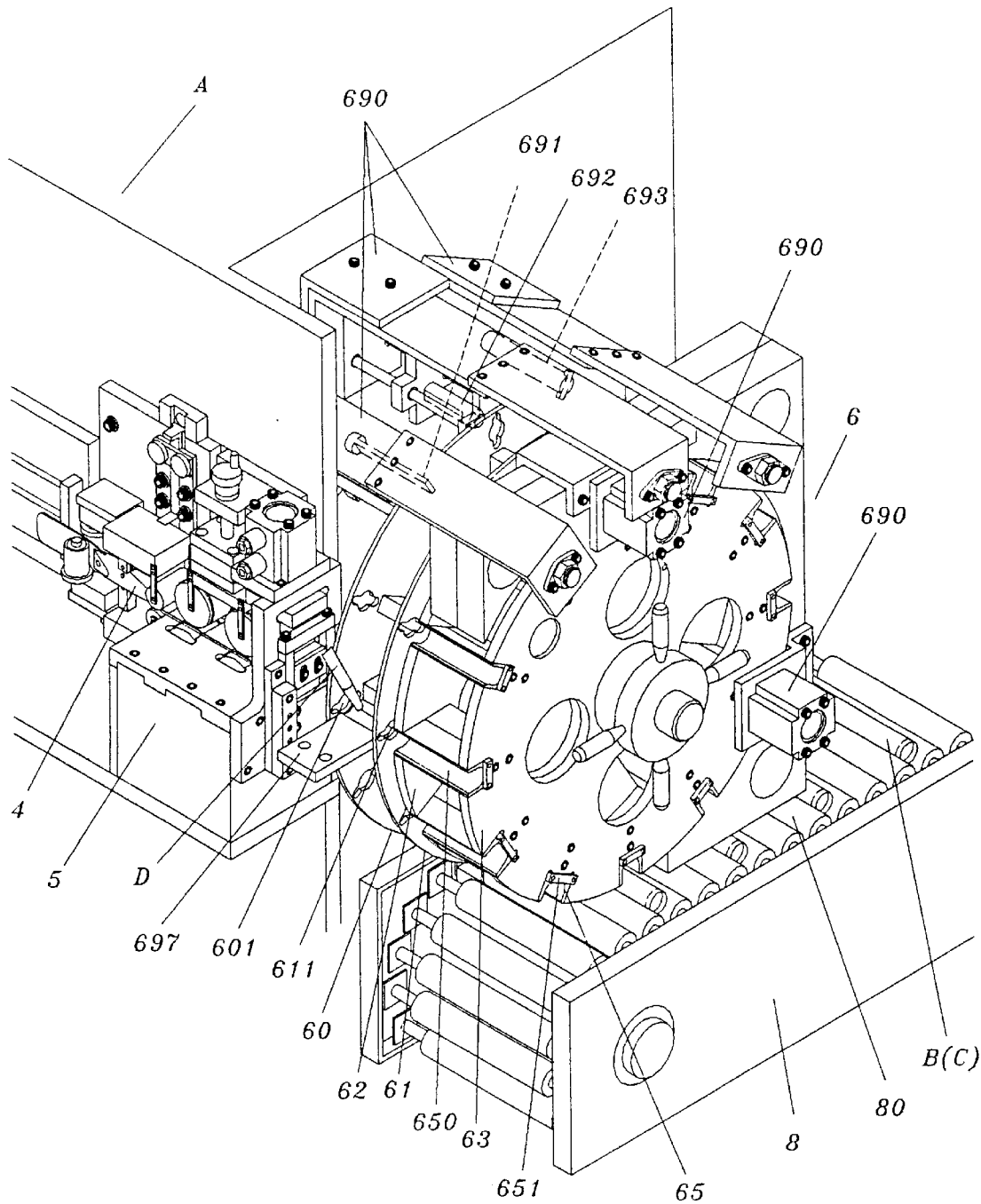
FIG. 12 is a perspective view in an enlarged scale of a part of the present invention, showing the position of the packing wheel relative to the cutter unit and the conveyer.

Referring to Figures from 10 to 12 and FIG. 8 again, the packing wheel 6 is comprised of four circular wheel boards 60;61;62;63 connected in parallel. The first circular wheel board 60 and the second circular wheel board 61 are arranged in a pair, each having a center hole 600;610, and a plurality of substantially cross-shaped through holes 601;611 equiangularly spaced along the border. A plurality of connecting blocks 64 are respectively connected between the first circular wheel board 60 and the second circular wheel board 61 corresponding to the through holes 601;611. The third circular wheel board 62 and the fourth circular wheel board 63 are arranged in a pair, each having a center hole 620;630, and a plurality of peripheral notches 621;631 equiangularly spaced along the border. A plurality of carrier blocks 65 are respectively connected between the third circular wheel board 62 and the fourth circular wheel board 63 corresponding to the peripheral notches 621;631, each defining a receiving trough 650. The receiving troughs 650 of the carrier blocks 65 are disposed in communication between the peripheral notches 621 on the third circular wheel board 62 and the peripheral notches 631 on the fourth circular wheel board 63. A stop member 651 is fastened to one end of the receiving trough 650 of each carrier block 65 corresponding to the outer side of the fourth circular wheel board 63. A spacer 66 is coupled between the second circular wheel board 61 and the third circular wheel board 62. An axle P is inserted in proper order through the center holes 600;610 on the circular wheel boards 60;61 and the center hole 660 on the spacer 66 and the center holes 620;630 on the circular wheel boards 62;63, and then screwed up with a nut 68. The nut 68 is fixedly secured in position by locating rods N. An axle bearing 67 is mounted around the axle P between the fourth circular wheel board 63 and the nut 68. Three inner push rods 69, namely, the first inner push rod 691, the second inner push rod 692 and the third inner push rod 693 are respectively inserted into three adjacent through holes 601 on the first circular wheel board 60, and reciprocated by a respective air cylinder 690. The first inner push rod 691 is a flat rod. The inner second push rod 692 has a conical front end. The third inner push rod 693 has two raised blocks symmetrically raised from the periphery at two opposite sides. A stop rod 694 is suspended above the third circular wheel board 62. A spring 695 is stopped above the stop rod 694. The stop rod 694 has a smoothly curved bottom end. The spring 695 imparts a downward pressure to the stop rod 694. Two outer push rods 696 are reciprocated by a respective air cylinder 690 relative to the fourth circular wheel board 63. One outer push rod 696 is aimed at the second inner push rod 693. A rack 697 is fixedly mounted on the feed unit 7 between the first circular wheel board 60 and the second circular wheel board 61 adjacent to the cutter blades 51;52 of the cutter unit 5. The rack 697 has a transverse groove 6970.

Figure 13:
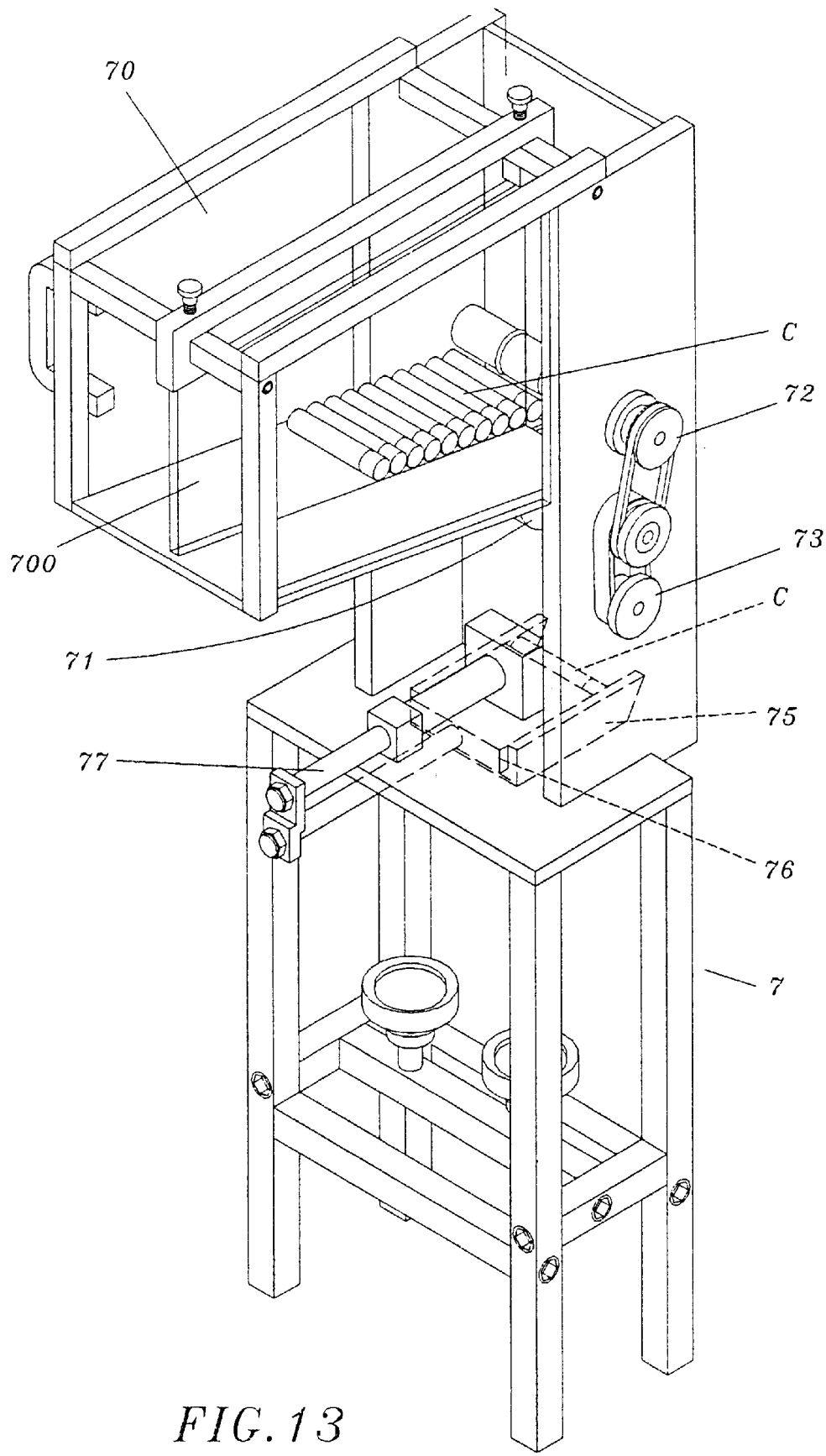
FIG. 13 is a perspective view in an enlarged scale of the feed unit according to the present invention.
Figure 14:
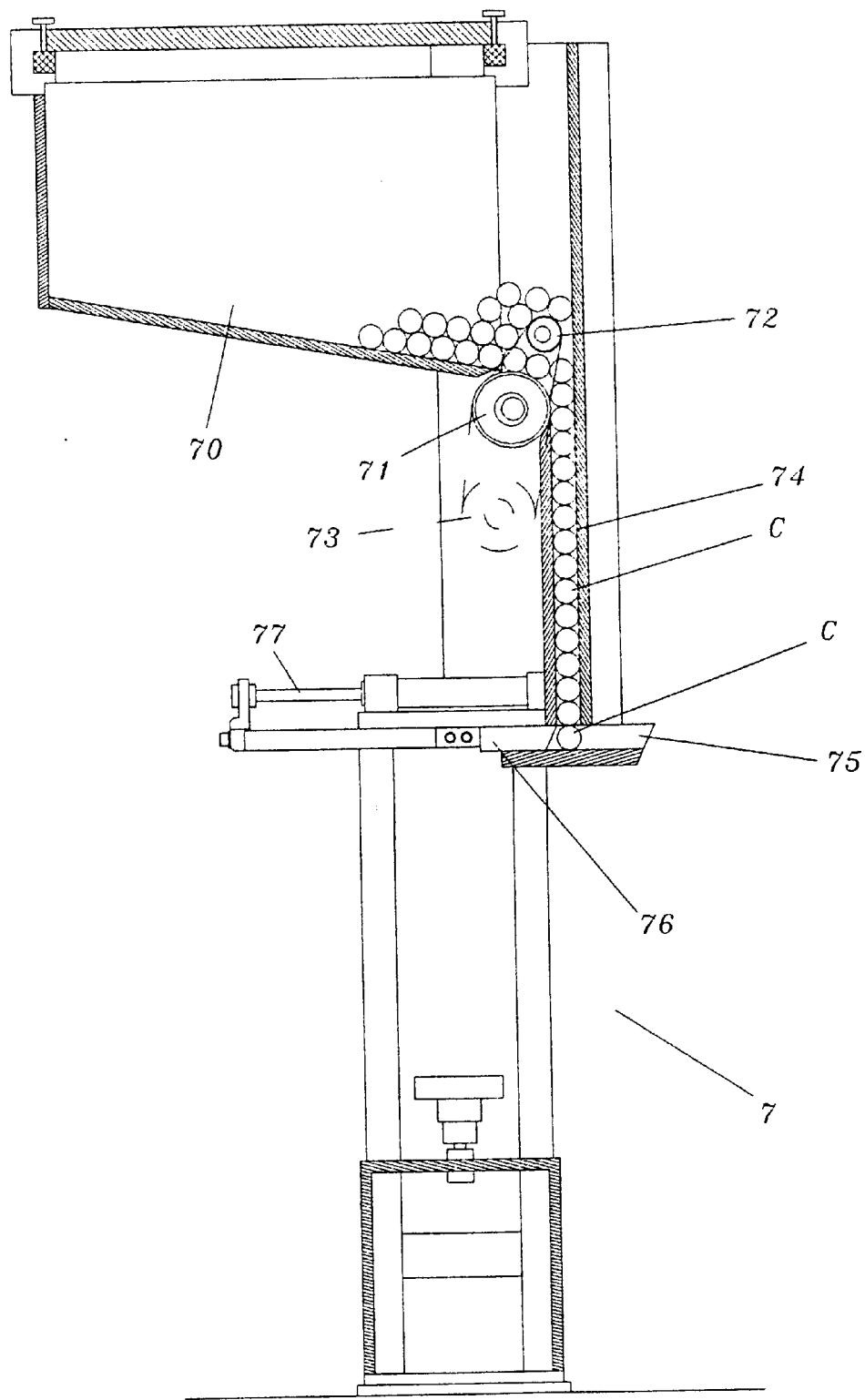
FIG. 14 is a side view in section of FIG. 13.

Referring to FIGS. 13 and 14, the feed unit 7 is provided at one side of the packing wheel 6. The feed unit 7 comprises a receiving chamber 70, which has a sloping bottom wall sloping in one direction, an adjustable partition board 700 moved to adjust the holding space of the receiving chamber 70 subject to the size of the products C to be labeled, a first eccentric wheel 71 and a second eccentric wheel 72 disposed at one end of the sloping bottom wall of the receiving chamber 70 and rotated to guide the products C out of the receiving chamber 70, a belt transmission mechanism 73 controlled to turn the eccentric wheels 71;72, a feed tray 75 spaced below the eccentric wheels 71;72, a product guide way 74 through which the products C are guided from the receiving chamber 70 to the feed tray 75 by the eccentric wheels 71;72, a push block 76 reciprocated by an air cylinder 77 to push the products C out of the feed tray 75 to the receiving troughs 650 of the carrier blocks 65.

Figure 15:
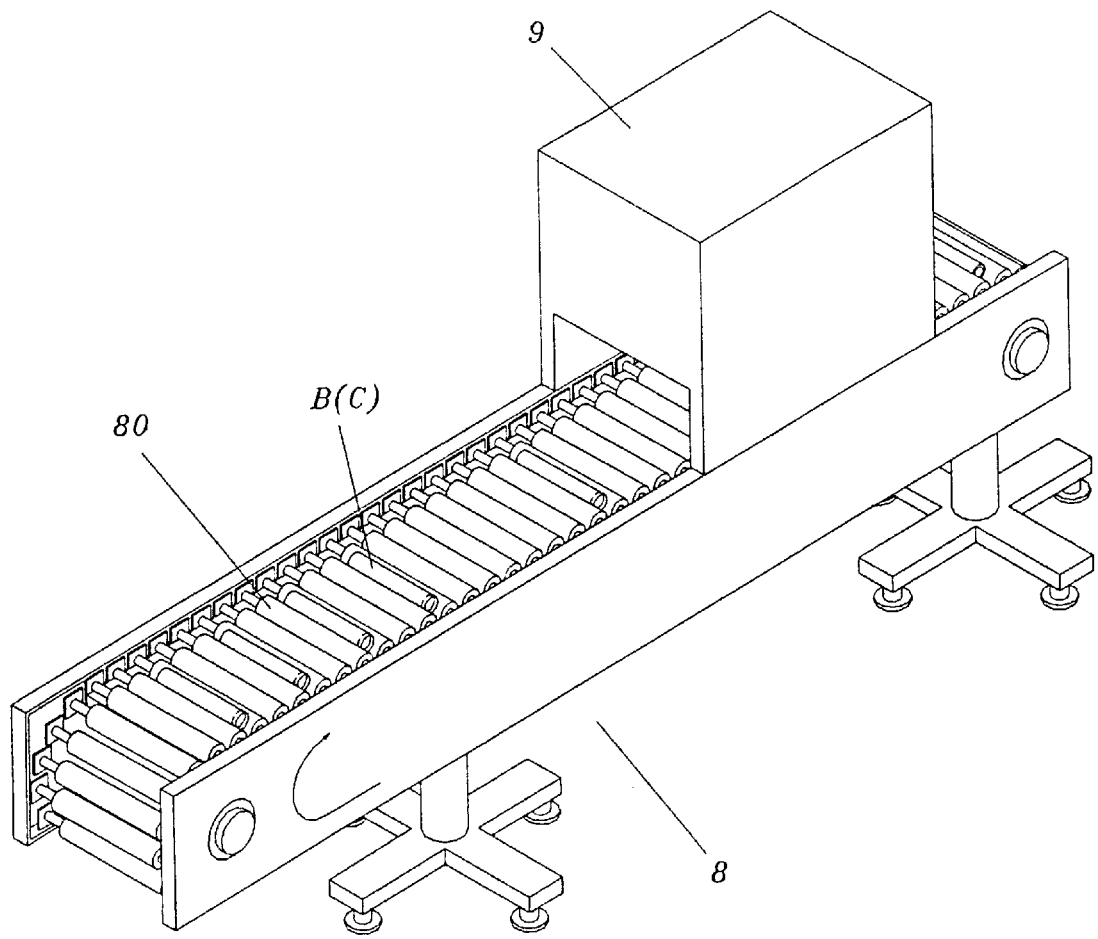
FIG. 15 is perspective view in an enlarged scale of a part of the present invention, showing the arrangement of the conveyer and the heating unit.

Referring to FIG. 15, the conveyer 8 is provided below the packing wheel 6, and operated to carry the products C, which are attached with a respective cut piece of the tubular thermo-shrinking film B, to the heating unit 9. The conveyer 8 is comprised of a plurality of transverse rollers 80 arranged in parallel. The product delivery direction of the conveyer 8 is reversed to the rotation direction of the rollers 80, therefore the respectively cut pieces of the tubular thermo-shrinking film B can be positively secured to the products C when passing through the heating unit 9.

Figure 7:
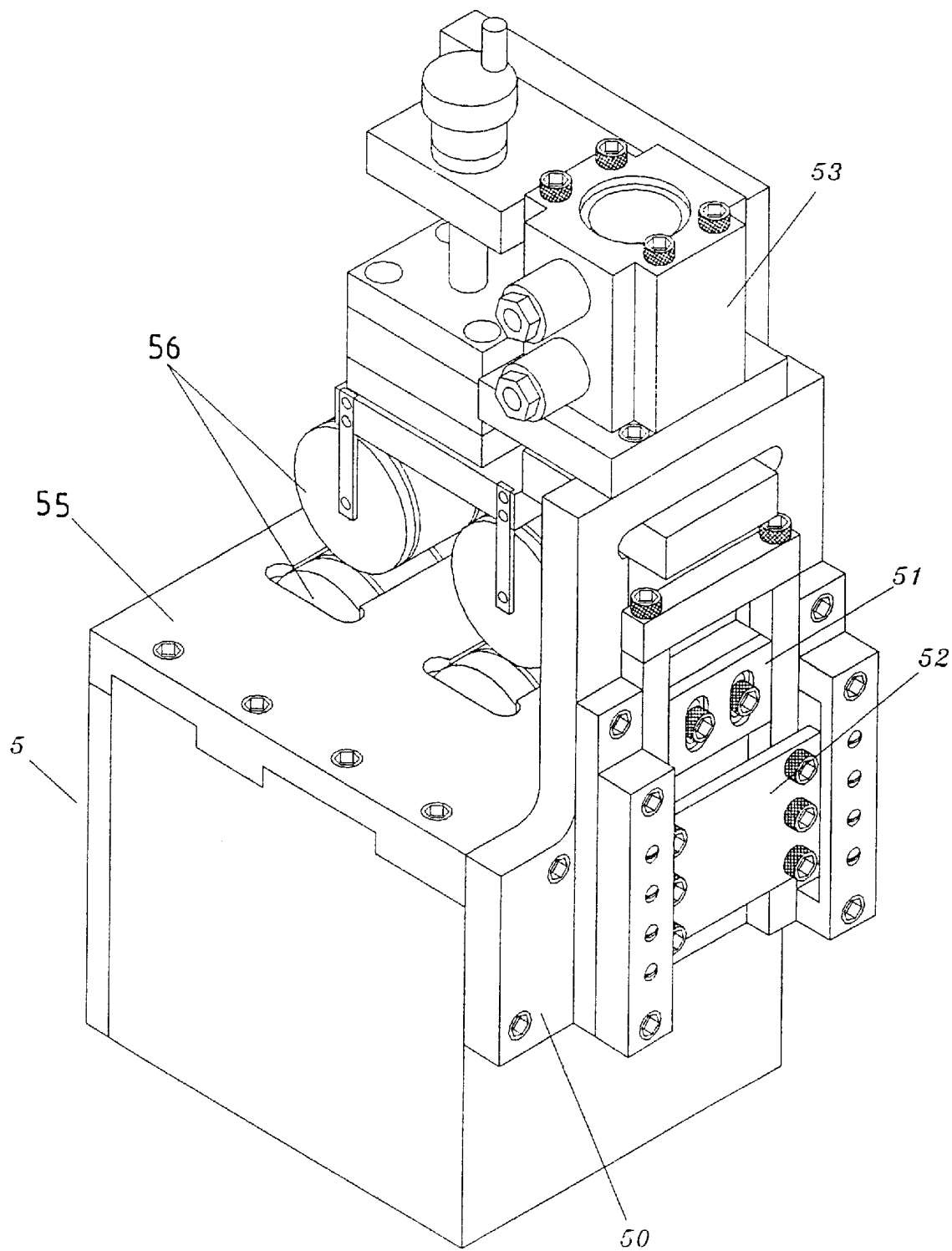
FIG. 7 is a perspective view in an enlarged scale of a part of the present invention, showing the arrangement of the cutter unit.
Figure 16:
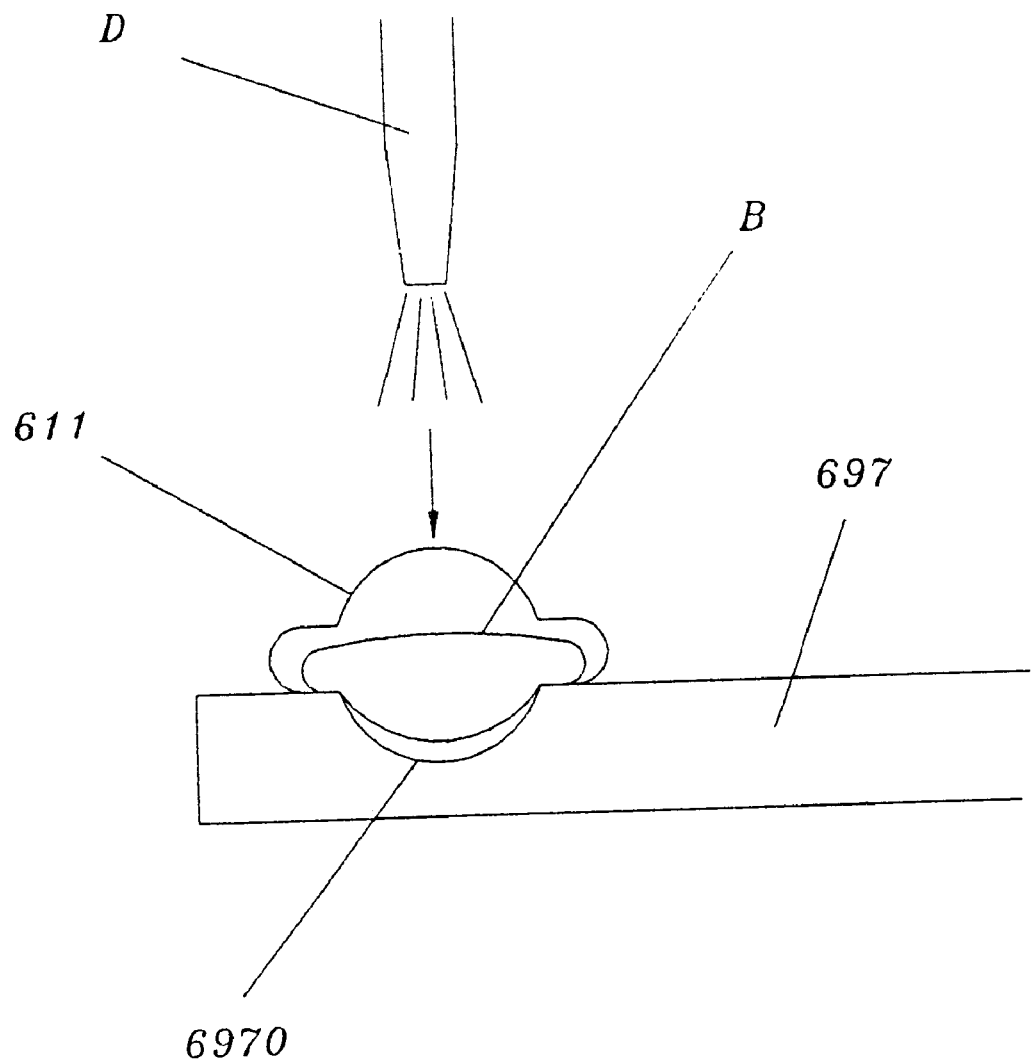
FIG. 16 is a schematic drawing of the present invention, showing the air nozzle blew at the cut piece of thermo-shrinking film.
Figure 17:
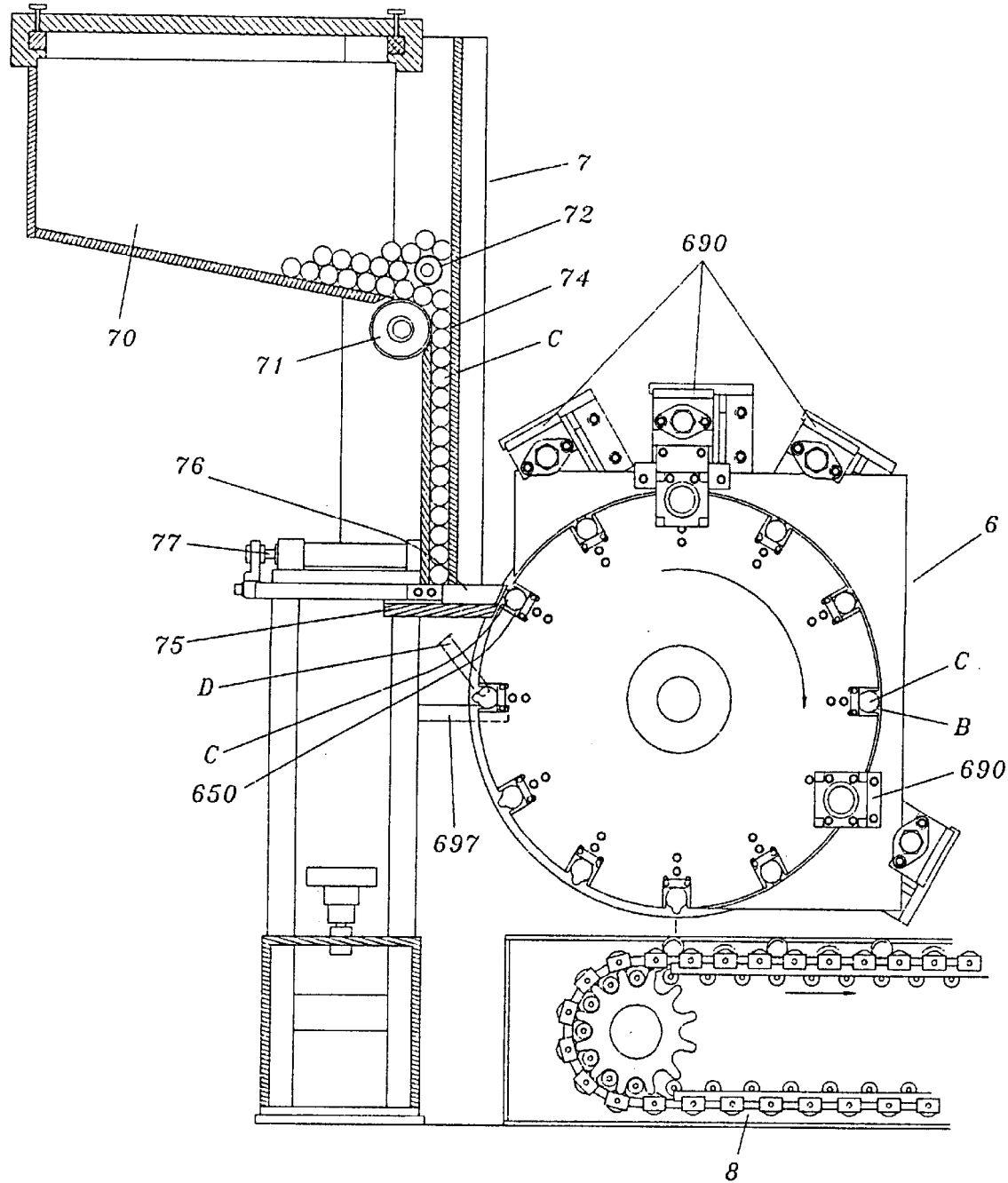
FIG. 17 is side view in an enlarged scale of a part of the present invention, showing the packing wheel arranged between the feed unit and the conveyer.
Figure 18:
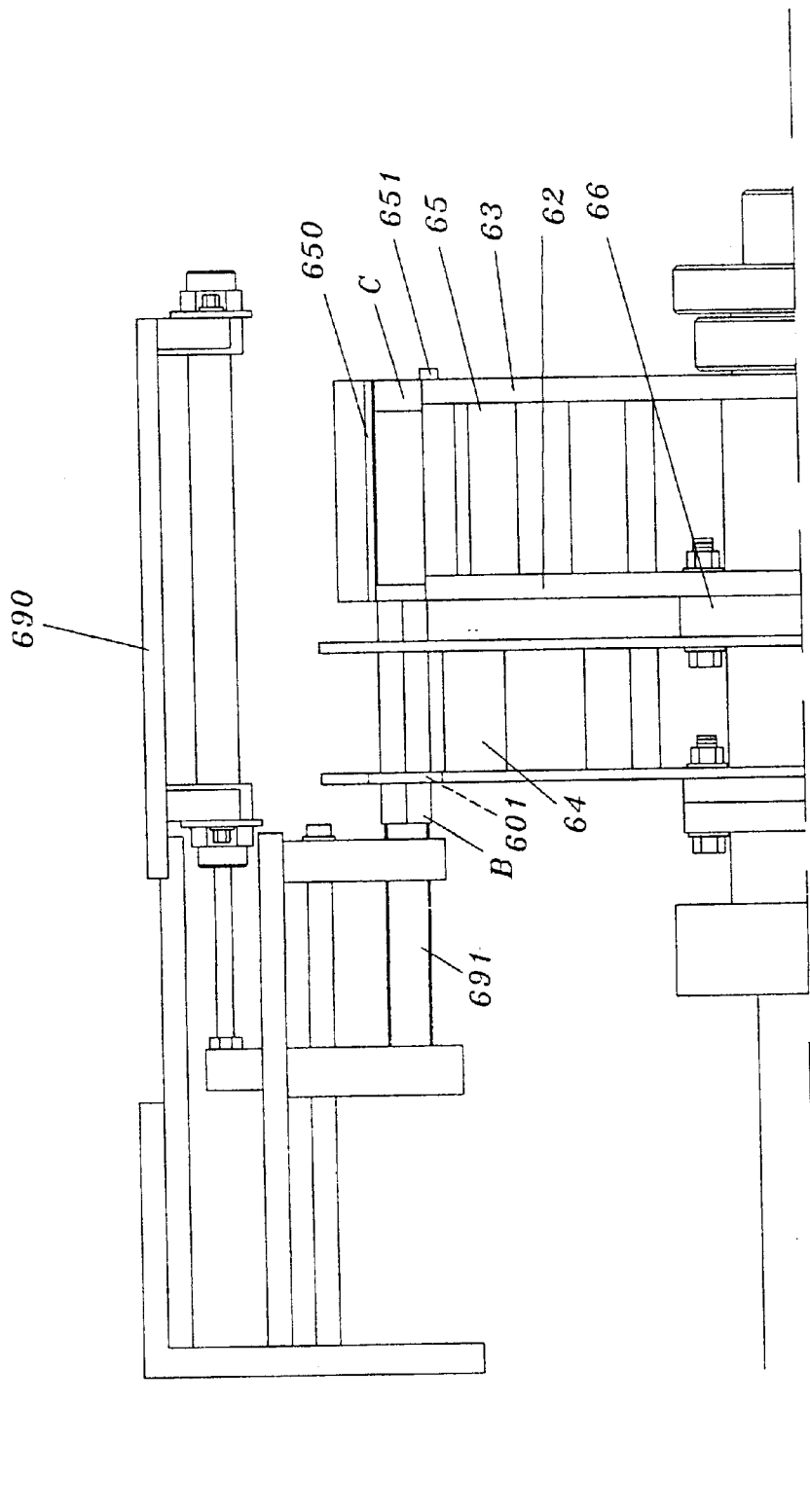
FIG. 18 shows the first inner push rod of the packing wheel operated according to the present invention.
Figure 19:
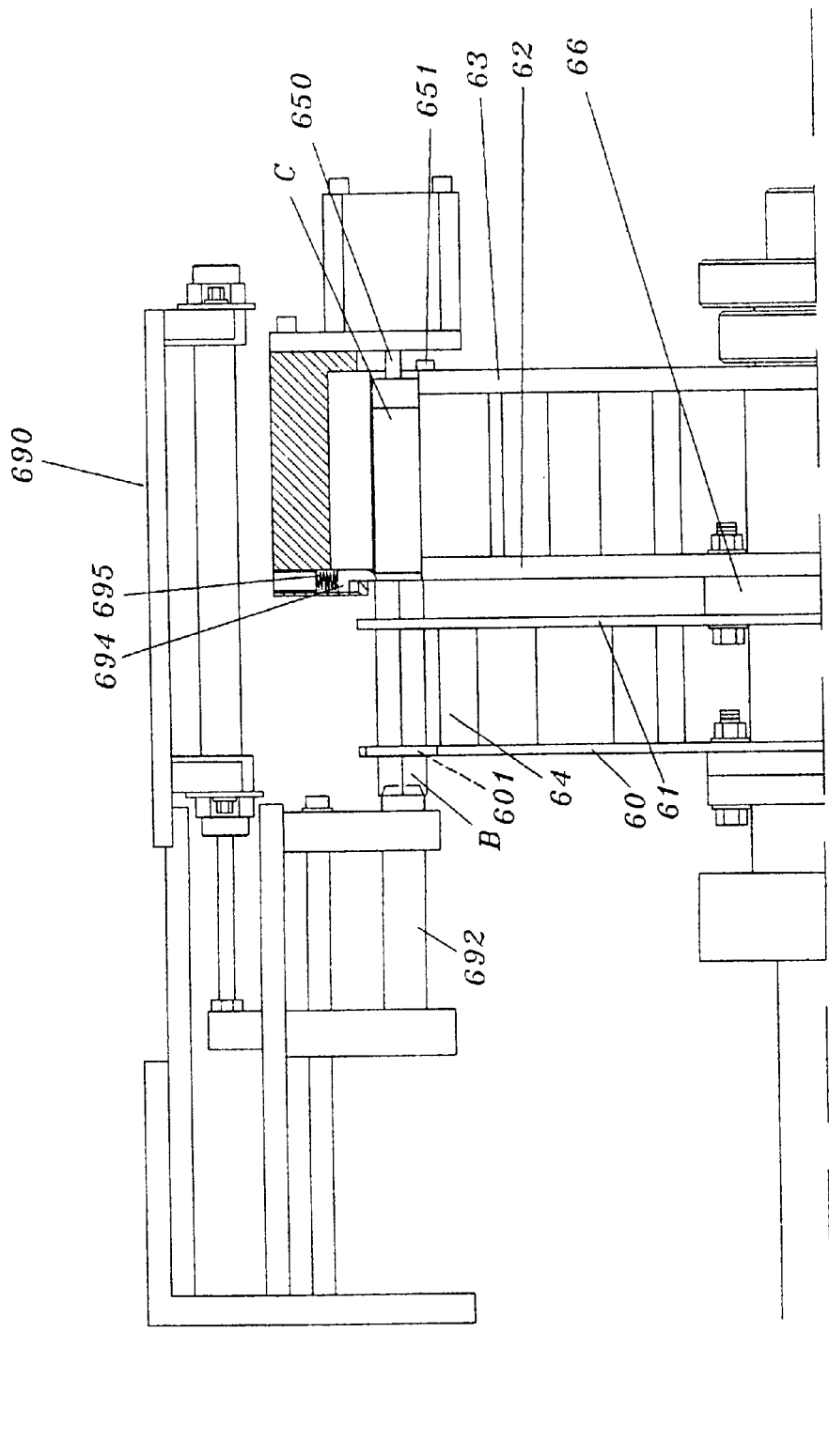
FIG. 19 shows the second inner push rod of the packing wheel operated according to the present invention.
Figure 20:
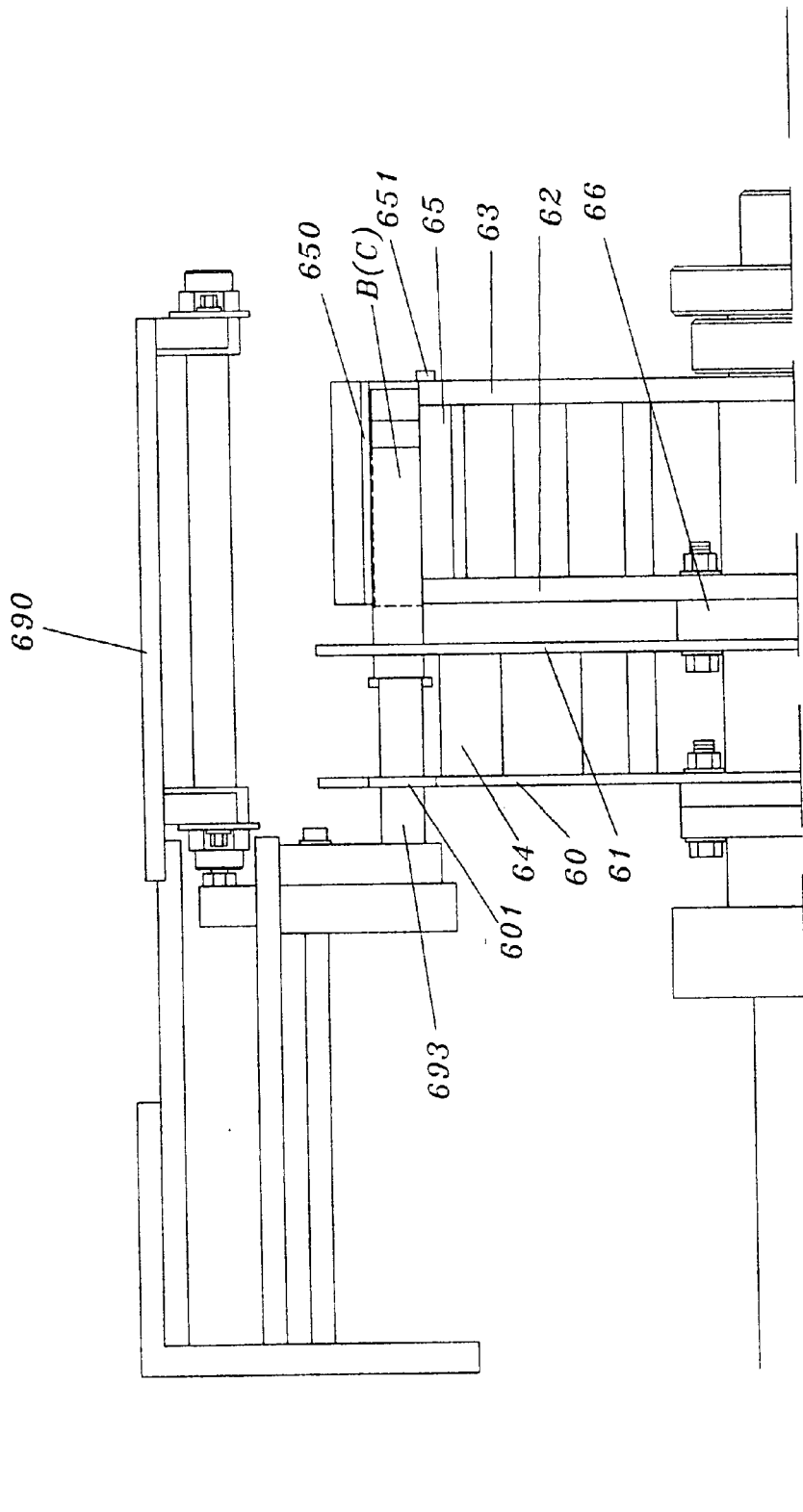
FIG. 20 shows the third inner push rod of the packing wheel operated according to the present invention.
Figure 21:
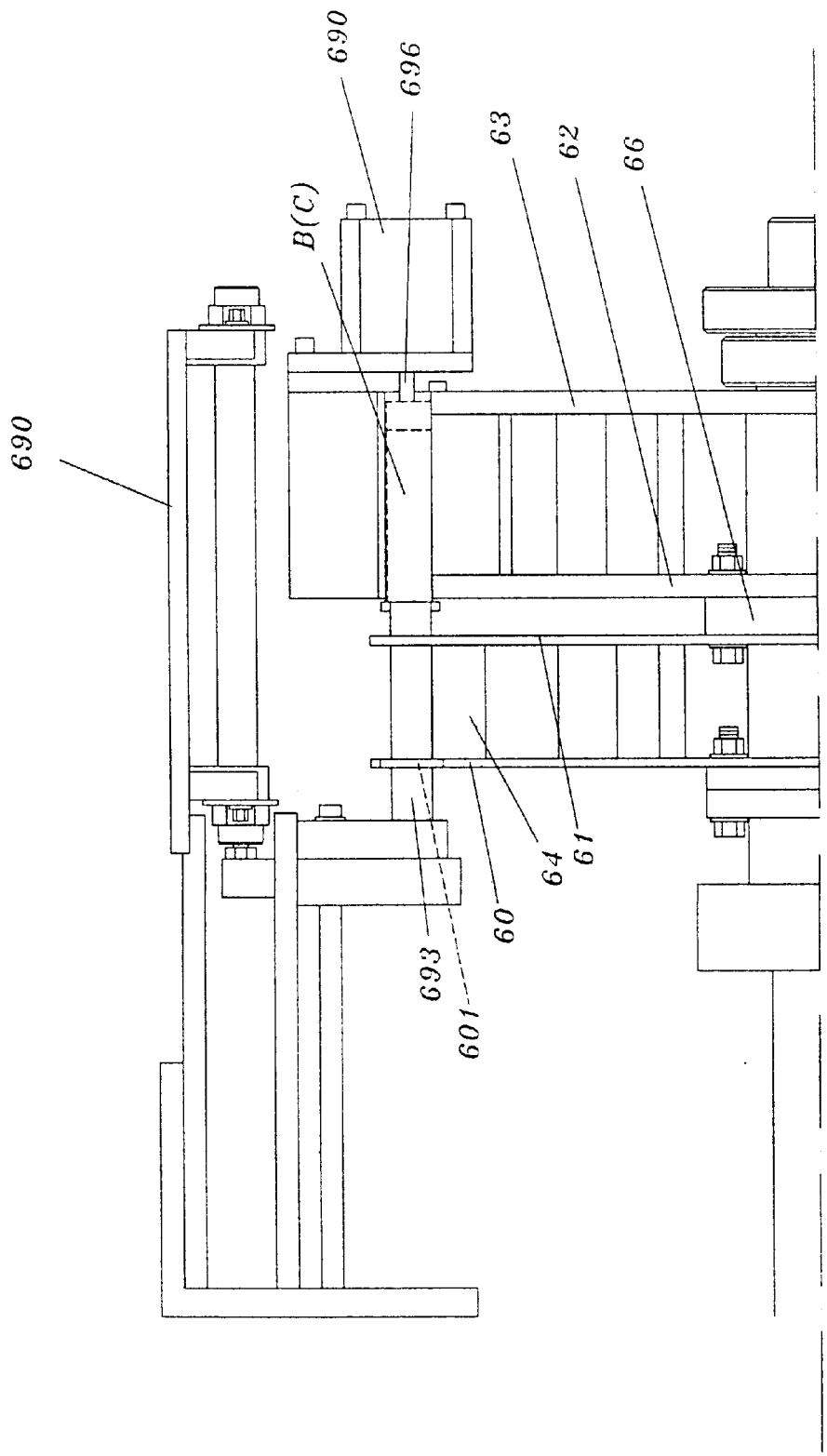
FIG. 21 shows the third inner push rod of the packing wheel operated according to the present invention.

When in use, the tubular thermo-shrinking film B is arranged in a flat manner and wound round the tubular thermo-shrinking film dispensing wheel 2 (see FIG. 2), permitting the lead end of the tubular thermo-shrinking film B to be inserted through the film-transfer rollers 41, the guide rollers 31, the movable roller 33, the stamp 36, the fixed guide rollers 37 and the movable stretcher 38 (see FIG. 4), and then sleeved onto the flat board 40 of the central guide shaft 4 (see FIG. 6). When operated, the lead end of the tubular thermo-shrinking film B which is sleeved onto the flat board 40 of the central guide shaft 4 is guided forwards by the film-transfer rollers 43;44;45 and stretched into an opened status by the shaft body 41 and the rods 42 of the central guide shaft 4, and then continuously moved forwards by the film-transfer rollers 56 of the cutter unit 5 and guided into the gap between the upper cutter blade 51 and the lower cutter blade 52 by the material guide plate 54 (see FIGS. 6, 7 and 8). When the tubular thermo-shrinking film B passes through the gap between the upper cutter blade 51 and the lower cutter blade 52, the upper cutter blade 51 is moved downwards toward the lower cutter blade 52 by the respective air cylinder 53, thereby causing the tubular thermo-shrinking film B to be cut. The cut piece of tubular thermo-shrinking film B is inserted into one through hole 601 on the first circular wheel board 60 and the corresponding through hole 602 on the second circular wheel board 61 and carried on the rack 697. At the same time, an air nozzle D is operated to blow at the cut piece of tubular thermo-shrinking film B (see FIG. 16), and the products C are pushed out of the feed tray 75 into the receiving troughs 650 of the carrier blocks 65 by the push block 76 (see FIGS. 14 and 17) in proper order. The receiving chamber 70 of the feed unit 7 is detachable. For example, the receiving chamber 70 can be made in the form of a cartridge that can be conveniently disconnected from the feed unit 7 for the loading of the products C to be labeled. When the products C to be labeled are loaded in the receiving chamber 70, it is put into the feed unit 7 again. A spare receiving chamber 70 may be provided for quick loading of the products C to be labeled. After a first cut piece of thermo-shrinking film B has been inserted into one through hole 601 on the first circular wheel board 60 and the corresponding through hole 602 on the second circular wheel board 61 and carried on the rack 697, the packing wheel 6 is rotated through an angle to receive a second cut piece of thermo-shrinking film B. When the packing wheel 6 is rotated step by step, cut pieces of thermo-shrinking film B are picked up by the packing wheel 6 one after another. When one cut piece of thermo-shrinking film B is moved with the packing wheel 6 into alignment with the first inner push rod 691, the first inner push rod 691 is moved forwards by the respective air cylinder 690 to push the respective cut piece of thermo-shrinking film B into alignment with the corresponding piece of product C (see FIG. 18). When the packing wheel 6 is continuously rotated to the next step, the stop rod 694 is lowered and stopped at the cut piece of thermo-shrinking film B being carried with the packing wheel 6 to the topmost position, and at the same time the second inner push rod 692 is moved by the respective air cylinder 690 to insert into the cut piece of thermo-shrinking film B and to push it to the receiving trough 650 of the corresponding carrier block 65, and the corresponding outer push rod 696 is driven by the respective air cylinder 690 to push the corresponding piece of product C into the corresponding cut piece of thermo-shrinking film B, enabling the corresponding cut piece of thermo-shrinking film B to be partially sleeved onto the corresponding piece of product C (see FIG. 19). When the packing wheel 6 is continuously rotated step by step, the third inner push rod 693 and the corresponding outer push rod 696 are driven by the respective air cylinders 690 to push the respective cut piece of thermo-shrinking film B and the respective piece of product C toward each other, enabling the respective cut piece of thermo-shrinking film B to be moved to the desired location around the respective piece of product C (see FIGS. 20 and 21). When one film loaded piece of product C is moved with the packing wheel 6 to the lowest position, the film loaded piece of product C falls to the conveyer 8, and is then carried by the conveyer 8 to the heating unit 9 for heating. When heated, the individual piece of thermo-shrinking film B is caused to shrink and to be firmly secured to the periphery of the respective piece of product C, and therefore the packing procedure is finished.

Referring to FIG. 4 again, when the thermo-shrinking film B is broken, the movable roller 33 is released from the thermo-shrinking film B, therefore the movable roller 33 falls along the rails 32 and touches the second micro-switch 35, causing it to cut off power supply. When the movable roller 33 is moved upwards along the rails 32 and the thermo-shrinking film B is well re-loaded, the machine is started again. If the thermo-shrinking film B is jammed, the movable roller 33 will be pulled upwards by the thermo-shrinking film B to touch the first micro-switch 34, causing it to cut off power supply. After the problem has been eliminated, the machine can then be started again.

While only one embodiment of the present invention has been shown and described, it will be understood that various modifications and changes could be made thereunto without departing from the spirit and scope of the invention disclosed.

What is claimed is:

1. A horizontal type thermo-shrinking film labeling machine comprising:

a thermo-shrinking film dispensing wheel having a tubular thermo-shrinking film wound thereon in a flat manner, said thermo-shrinking film dispensing wheel being rotated to let off said tubular thermo-shrinking film;

brake means controlled to stop said thermo-shrinking film dispensing wheel from rotating;

a film delivery unit controlled to deliver said thermo-shrinking film to a central guide shaft, said film delivery unit comprising a plurality of film-transfer rollers and guide rollers controlled to move said thermo-shrinking film forwards, a movable stretcher which controls the tension of said thermo-shrinking film, and a stamp controlled to stamp a pattern on said thermo-shrinking film;

a central guide shaft and film-transfer rollers mounted behind said film delivery unit for receiving said thermo-shrinking film and guiding it forwards in a tubular condition;

a cutter unit controlled to cut said thermo-shrinking film being delivered from said central guide shaft, said cutter unit comprising a cutter holder, a lower cutter blade fixedly mounted on said cutter holder, an upper cutter blade vertically moved up and down on said cutter holder, an air cylinder controlled to move said upper cutter blade relative to said lower cutter blade so as to cut said thermo-shrinking film, and a material guide plate which guides said thermo-shrinking film from said central guide shaft to the cutting position;

a packing wheel rotated step by step to pick up cut pieces of said thermo-shrinking film one after another and to sleeve the cut pieces of said thermo-shrinking film onto products loaded thereon individually, said packing wheel comprising a first circular wheel board, a second circular wheel board, a third circular wheel board and a fourth circular wheel board connected in parallel by an axle and a nut, said first circular wheel board and said second circular wheel board each having a plurality of substantially cross-shaped through holes equiangularly spaced along the border thereof for receiving the cut pieces of said thermo-shrinking film from said cutter unit, said third circular wheel board and said fourth circular wheel board each having a plurality of peripheral notches equiangularly spaced along the border thereof corresponding to the cross-shaped through holes on said first and second circular wheel boards, a spacer mounted around said axle between said second circular wheel board and said third circular wheel board, a plurality of connecting blocks respectively connected between said first circular wheel board and said second circular wheel board, a plurality of carrier blocks respectively connected between said third circular wheel board and said fourth circular wheel board corresponding to said peripheral notches, said carrier blocks each defining a receiving trough for receiving the loaded products to be labeled, enabling the loaded products to be sleeved with a respective cut piece of said thermo-shrinking film;

a rack disposed between said first circular wheel board and said second circular wheel board for holding a cut piece of said thermo-shrinking film, enabling it to be further carried forwards by said packing wheel;

three inner push rods and two outer push rods driven by respective air cylinders to push the cut pieces of said thermo-shrinking film being carried on said packing wheel and the products being carried on said packing wheel, enabling the cut pieces of said thermo-shrinking film to be sleeved onto the products respectively;

a feed unit controlled to feed the products to be labeled to the receiving troughs of said carrier blocks, said feed unit comprising a receiving chamber, which holds the products to be labeled, an adjustable partition board moved to adjust the holding space of said receiving chamber subject to the size of the products to be labeled, two eccentric wheels arranged in parallel and rotated to move the products out of said receiving chamber, a belt transmission mechanism controlled to turn said eccentric wheels, a feed tray spaced below said eccentric wheels, a product guide way through which the products are guided from said receiving chamber to said feed tray, a push block reciprocated by an air cylinder to push the products out of said feed tray to the receiving troughs of said carrier blocks one after another during the rotary motion of said packing wheel;

a conveyer operated to carry the products, which are attached with a respective cut piece of said tubular thermo-shrinking film, to a heating unit for heating, said conveyer comprised of a plurality of transverse rollers arranged in parallel, the product delivery direction of said conveyer being reversed to the rotation direction of said transverse rollers;

a heating unit controlled to heat the cut pieces of said thermo-shrinking film and the respective pieces of the products being carried by said conveyer.

2. The horizontal type thermo-shrinking film labeling machine of claim 1 wherein said shrinking film dispensing wheel further comprises two vertical guide rails arranged in parallel, a movable roller moved along said vertical guide rails to guide said thermo-shrinking film to said central guide shaft, a first micro-switch and a second micro-switch respectively disposed near top and bottom ends of said guide rails to automatically cut off power supply when touched by said movable roller.

3. The horizontal type thermo-shrinking film labeling machine of claim 1 wherein said central guide shaft comprises a cylindrical shaft body having a front end and a rear end, a flat front board extended from the front end of said shaft body for receiving said thermo-shrinking film from said film delivery unit, and two parallel rods extended from the rear end of said shaft body and aimed at said cutter unit, said flat front board having rollers mounted thereon for guiding said thermo-shrinking film forwards.

4. The horizontal type thermo-shrinking film labeling machine of claim 1, wherein said packing wheel further comprises a spring, and a stop rod forced by said spring to stop the cut piece of said thermo-shrinking film at the corresponding piece of product, when the corresponding piece of product is pushed by one of said outer push rods into the corresponding cut piece of said thermo-shrinking film.

* * * * *